(12) United States Patent
Fujii

(10) Patent No.: US 10,060,159 B2
(45) Date of Patent: Aug. 28, 2018

(54) LOCKING SYSTEM

(71) Applicant: HONDA MOTOR CO., LTD., Tokyo (JP)

(72) Inventor: Ryo Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 447 days.

(21) Appl. No.: 14/932,968

(22) Filed: Nov. 5, 2015

(65) Prior Publication Data

US 2016/0160533 A1    Jun. 9, 2016

(30) Foreign Application Priority Data

Dec. 5, 2014    (JP) .................................. 2014-246641

(51) Int. Cl.
*E05B 65/00*    (2006.01)
*E05B 35/00*    (2006.01)

(52) U.S. Cl.
CPC .......... *E05B 65/006* (2013.01); *E05B 35/008* (2013.01)

(58) Field of Classification Search
CPC .... F16B 21/02; F16B 23/0069; E05B 65/006; E05B 15/08; E05B 35/008
See application file for complete search history.

(56) References Cited

U.S. PATENT DOCUMENTS

| 3,744,101 A * | 7/1973 | Gley ....................... F16B 21/02 24/453 |
| 6,540,461 B1 * | 4/2003 | Hawang .................. F16B 21/02 411/41 |
| 2005/0204875 A1 * | 9/2005 | Schluter ................ B25B 13/485 81/436 |
| 2007/0284167 A1 * | 12/2007 | Watanabe ............. B60L 3/0046 180/68.5 |
| 2012/0115001 A1 * | 5/2012 | Hatta ....................... B60K 1/04 429/100 |

FOREIGN PATENT DOCUMENTS

JP    2006-228526    8/2006

* cited by examiner

*Primary Examiner* — Jonathan P Masinick
(74) *Attorney, Agent, or Firm* — Mori & Ward, LLP

(57) ABSTRACT

A locking system includes a casing, a covering component, a locking component, and a locking release component. The casing is to house a device in the casing having an opening. The covering component is to cover the opening of the casing. The locking component is to fasten the casing and the covering component to each other. The locking component includes a key receiving portion including a projection and a single recess. The locking release component is to engage with the key receiving portion of the locking component so that the locking component is rotated to release fastening between the casing and the covering component. The locking release component includes a releasing side recess to engage with the projection of the key receiving portion and a releasing side projection to engage with the single recess of the key receiving portion.

18 Claims, 11 Drawing Sheets

BACKGROUND ART

LOCKING SYSTEM

CROSS-REFERENCE TO RELATED APPLICATIONS

The present application claims priority under 35 U.S.C. § 119 to Japanese Patent Application No. 2014-246641, filed Dec. 5, 2014, entitled "Locking System." The contents of this application are incorporated herein by reference in their entirety.

BACKGROUND

1. Field

The present disclosure relates to a locking system.

2. Description of the Related Art

Electric devices (electronic devices) typically have an interlock mechanism that releases locking by using a specific part. For example, hybrid vehicles, electric vehicles (EV), and other electrically driven vehicles have, as a power source for driving the motor, a high-voltage battery module having a plurality of batteries (battery cells) stacked therein. In such vehicles, the batteries, the power control unit (PCU), and the like are housed in a casing in which various types of interlock mechanisms are used to block access from outside.

A battery pack disclosed in, for example, Japanese Unexamined Patent Application Publication No. 2006-228526 has a battery casing in which a battery module and other ancillary parts are housed. Such a battery casing has a lower casing that supports the battery module and the ancillary parts, a battery module cover that includes a cover on the battery module, and an ancillary part cover that includes a cover on the ancillary parts.

The battery module cover is secured to the lower casing so as not to be detachable, while the ancillary part cover is secured to the lower casing with an interlock clip 1 shown in FIG. 11 therebetween so as to be detachable. The interlock clip 1 has a cylindrically shaped head 2 and a clip 3. The head 2 has a plurality of recessed locking holes 4 coaxially formed on the same circumference thereof. The interlock clip 1 is configured to be detachable through the engagement of a service plug (not illustrated) with the recessed locking hole 4.

SUMMARY

According to one aspect of the present invention, a locking system includes a casing, a covering component, a locking component, and a locking release component. The casing houses a device. The covering component covers an opening of the casing. The locking component fastens the casing and the covering component to each other. The locking release component engages with a key receiving portion provided in the locking component and releases fastening by the locking component by causing the locking component to be rotated. The key receiving portion has a projection provided at a rotational center and a single recess provided away from the rotational center. The locking release component has a releasing side recess that engages with the projection and a releasing side projection that engages with the recess.

According to another aspect of the present invention, a locking system includes a casing, a covering component, a locking component, and a locking release component. The casing is to house a device in the casing having an opening. The covering component is to cover the opening of the casing. The locking component is to fasten the casing and the covering component to each other. The locking component includes a key receiving portion including a projection and a single recess. The projection is provided at a rotational center of the key receiving portion. The single recess is provided away from the rotational center. The locking release component is to engage with the key receiving portion of the locking component so that the locking component is rotated to release fastening between the casing and the covering component. The locking release component includes a releasing side recess to engage with the projection of the key receiving portion and a releasing side projection to engage with the single recess of the key receiving portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
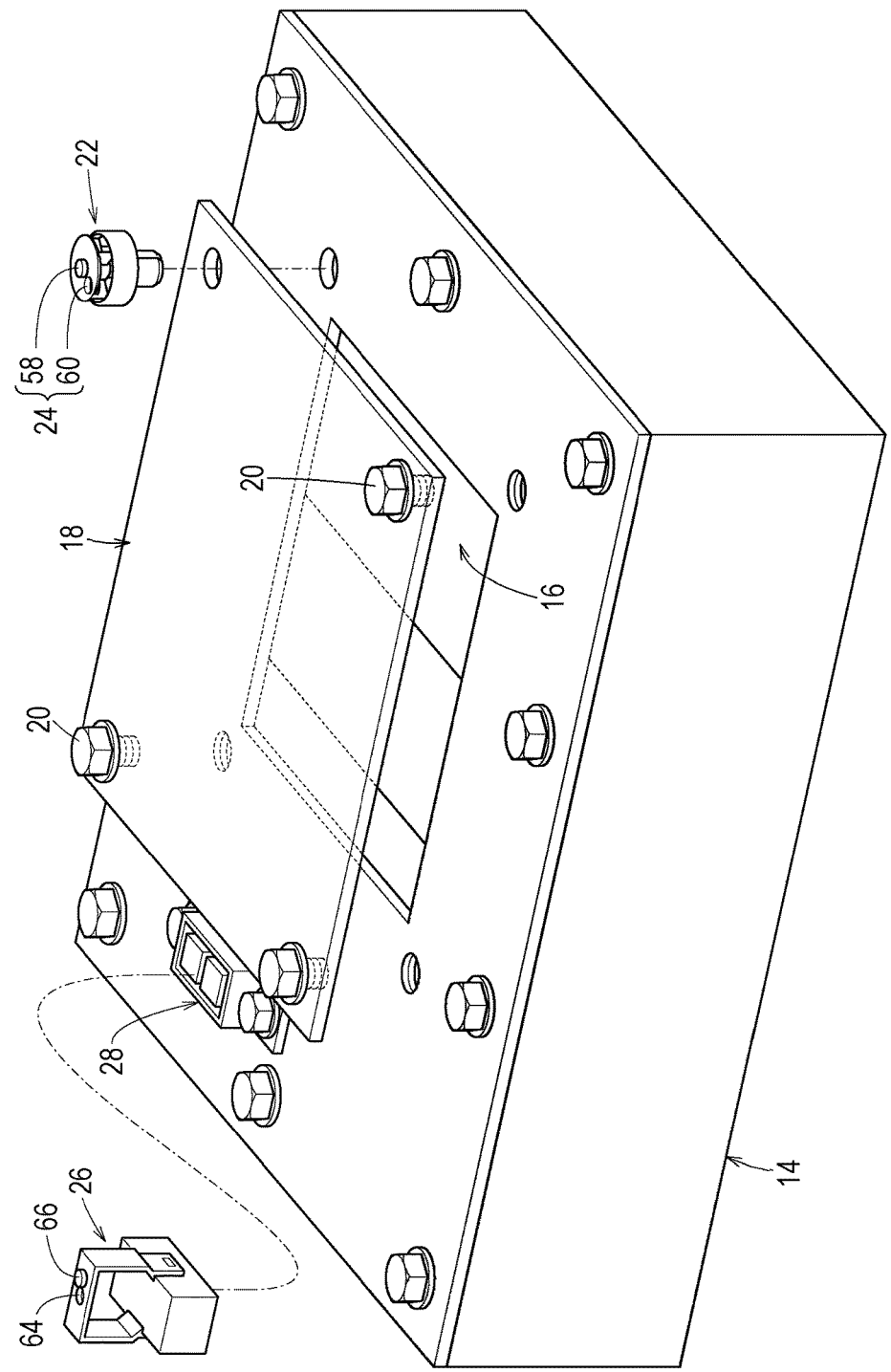
FIG. 1 is a schematic perspective view of an onboard battery pack incorporating a locking system according to a first embodiment of the present application.

The embodiments will now be described with reference to the accompanying drawings, wherein like reference numerals designate corresponding or identical elements throughout the various drawings.

Figure 2:
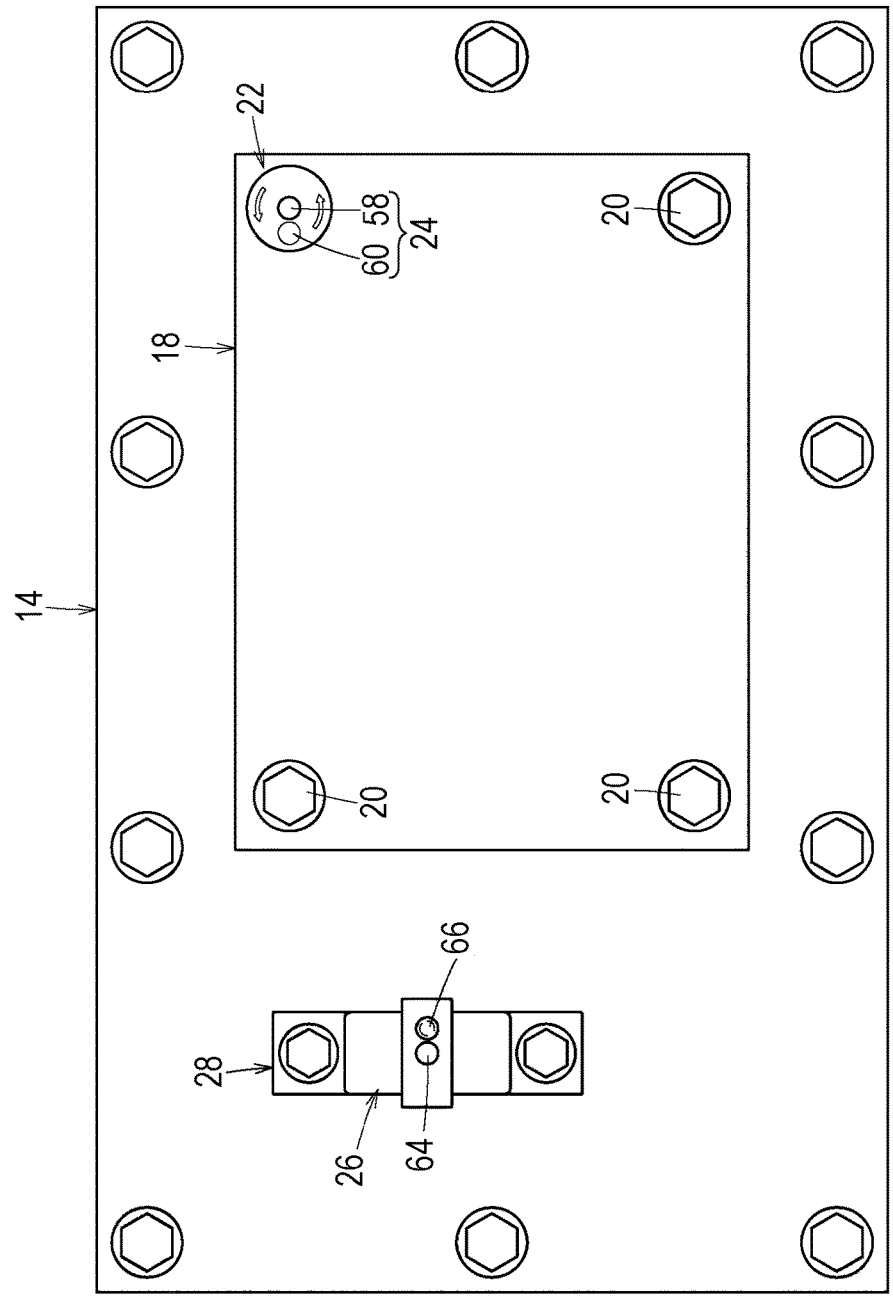
FIG. 2 is a schematic plan view of the onboard battery pack.

As shown in FIGS. 1 and 2, a locking system 10 according to a first embodiment of the present application is incorporated in, for example, an onboard battery pack 12 mounted on a hybrid vehicle, electric vehicle (EV), or other type of electrically driven vehicle (not illustrated).

The battery pack 12 has a casing 14 that houses a battery module having serially connected batteries (battery cells) stacked therein, a power control unit (PCU), and other type of electric device. The casing 14 has an opening 16 formed therein to allow battery replacement or other maintenance work to be conducted. A covering component 18 that opens and closes the opening 16 is provided on the casing 14 so as to be detachable.

The covering component 18 is secured to the top surface of the casing 14 with a plurality of bolts 20 and one locking component (dedicated clip) 22 therebetween. The locking component 22 has a key receiving portion 24. The casing 14 has a service plug (locking release component) 26 provided thereon that is configured to engage with the key receiving portion 24 and release fastening by the locking component 22 by causing the locking component 22 to be rotated.

The service plug 26 is attachable to/detachable from a main unit plug 28 and is connected to an intermediate portion of the batteries in such a manner that an electric circuit can be cut off. When the service plug 26 and the main unit plug 28 are connected to each other, the batteries are electrically connected in series, making it possible to supply electric power from the battery module. When the service plug 26 is disconnected from the main unit plug 28, the intermediate portion of the battery module is electrically cut off, making it impossible to supply electric power from the battery module. The service plug 26 and the main unit plug 28 constitute an interlock mechanism.

Figure 3:
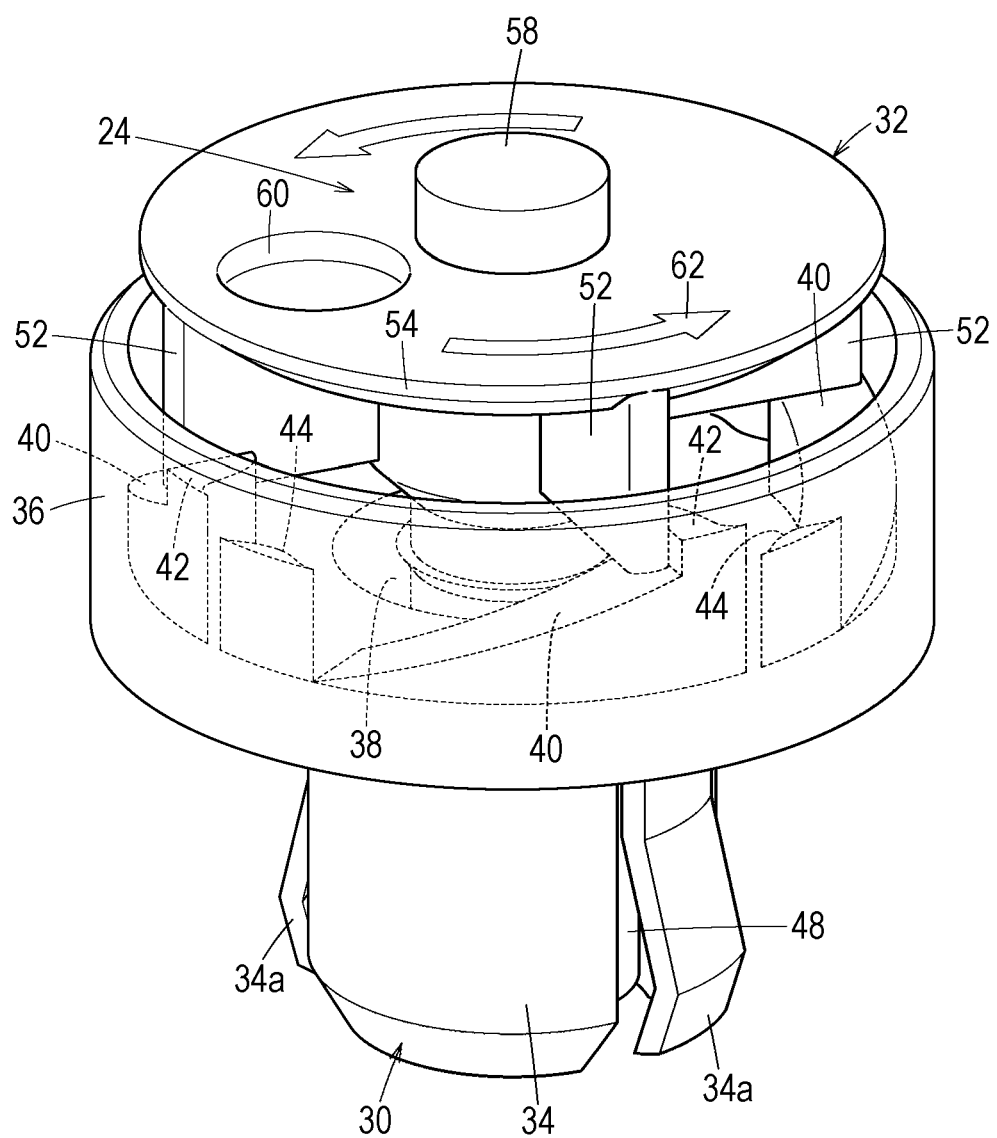
FIG. 3 is a schematic perspective view of a locking component constituting the locking system.
Figure 4:
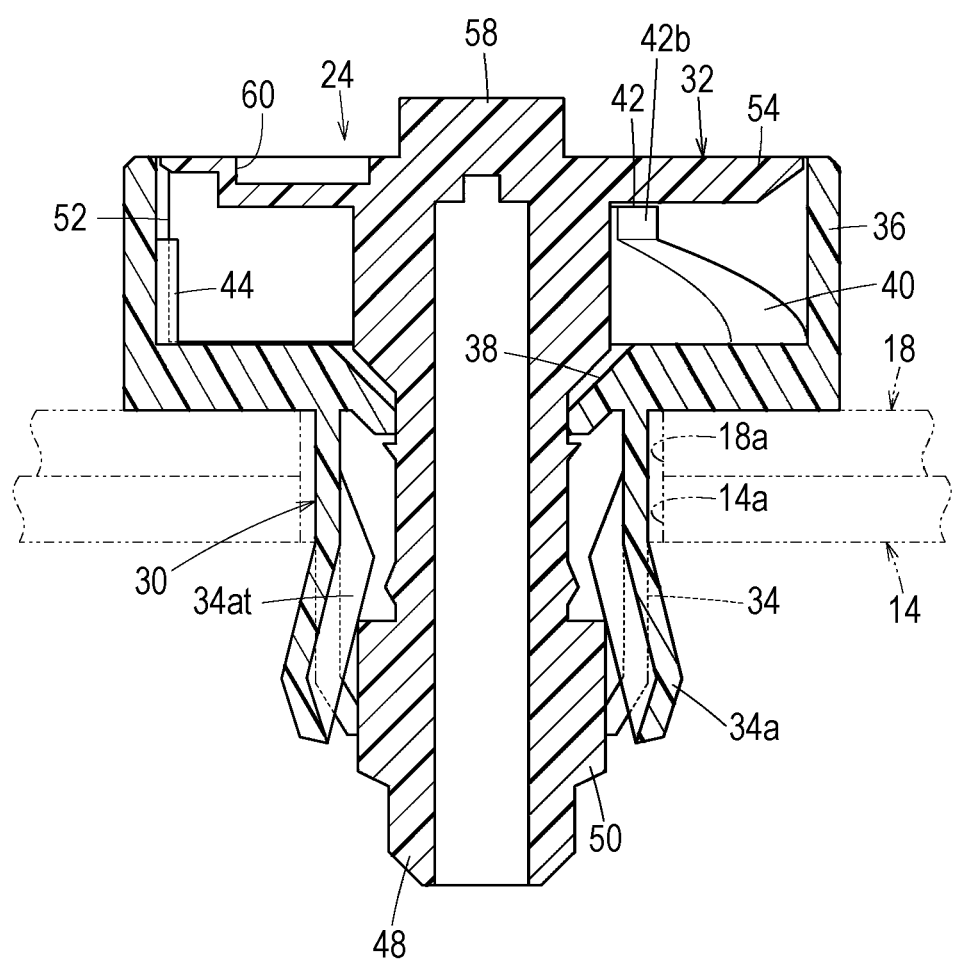
FIG. 4 is a cross-sectional view of the locking component.
Figure 5:
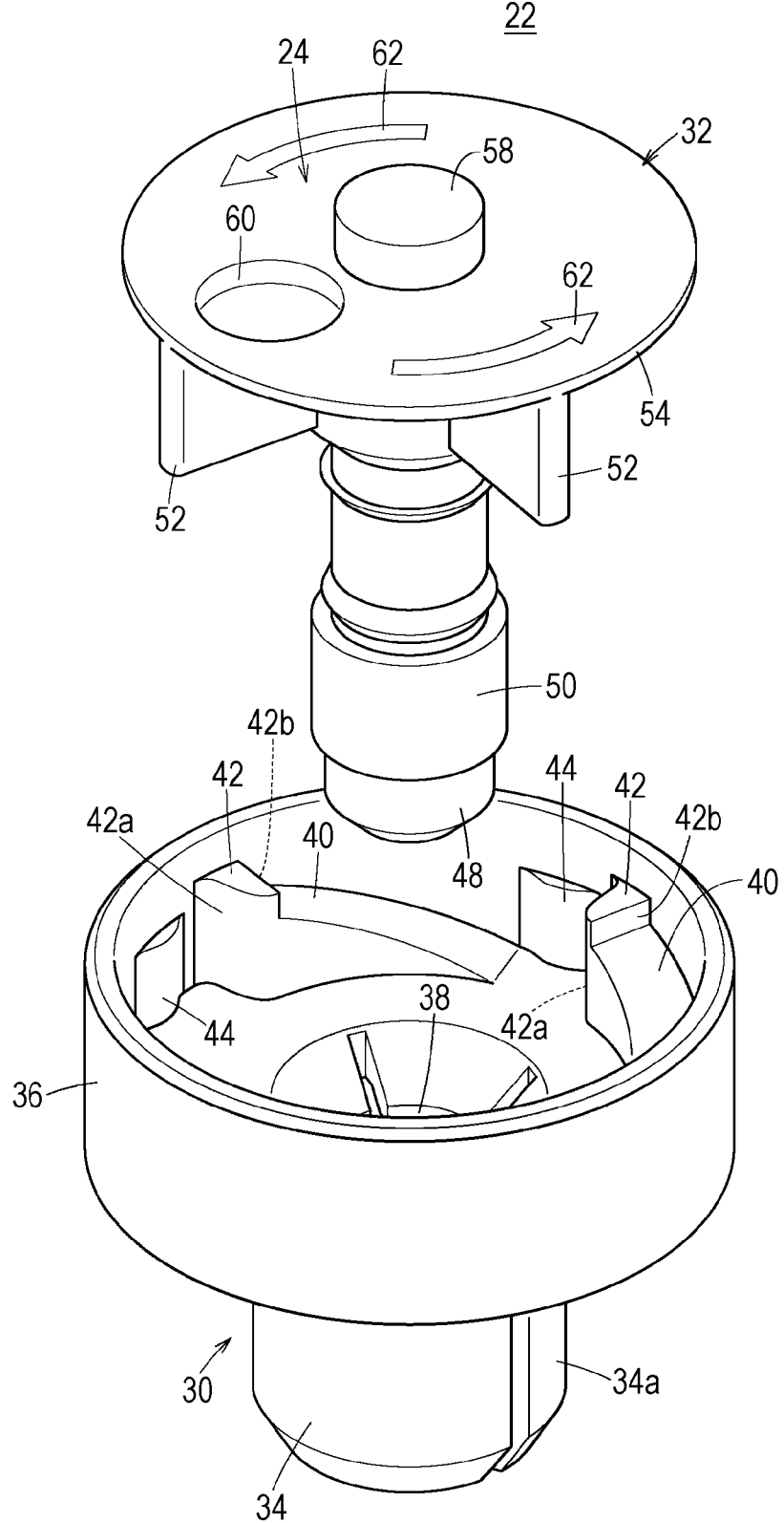
FIG. 5 is a partially schematic perspective view of a grommet constituting the locking component.

As shown in FIGS. 3 through 5, the locking component 22 has a grommet 30 that is inserted into a hole 14a of the casing 14 and a hole 18a of the covering component 18 as a single unit and a rotating portion 32 that fits into the grommet 30.

The grommet 30 is made of, for example, resin and has a cylindrical portion 34 that is inserted into the holes 14a, 18a as a single unit. The cylindrical portion 34 is circumferentially divided into a plurality of segments and has expandable/shrinkable portions 34a that are spaced at a predetermined angle away from each other. The expandable/shrinkable portions 34a are radially deformable around a base end of the cylindrical portion 34. A larger-diameter cylindrical portion 36 is formed integrally with the base end side of the cylindrical portion 34.

The larger-diameter cylindrical portion 36 has a hole 38 formed in the center thereof and a plurality of slanted guide surfaces 40 formed around the hole 38. The slanted guide surfaces 40 have a slanted surface that becomes higher (or farther away from the cylindrical portion 34) toward an axially upper end of the larger-diameter cylindrical portion 36.

Figure 6:
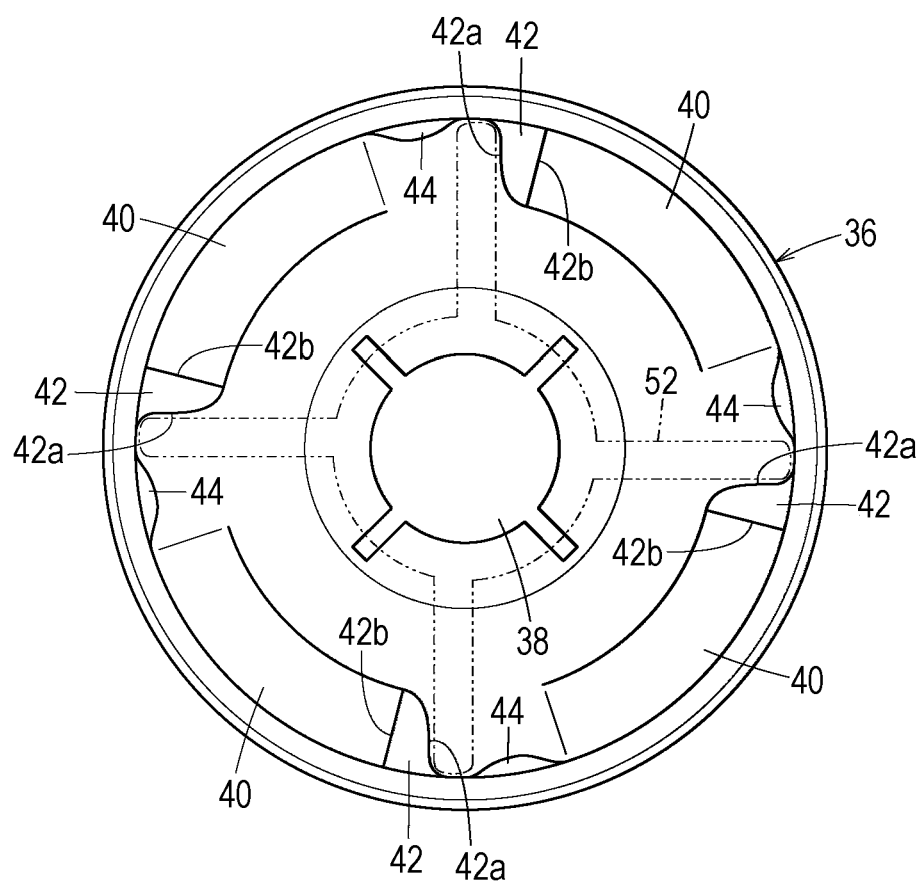
FIG. 6 is a schematic plan view of the grommet.

As shown in FIGS. 5 and 6, the larger-diameter cylindrical portion 36 has (four, for example) protruding portions 42 formed on an inner circumferential surface thereof, which are spaced at an equal angle away from one another and hold a rotating portion 32 to be described later at the lower end position and the upper end position. Sides 42a of the protruding portions 42 hold the rotating portion 32 at the lower end position, while sides 42b on the opposite side of the protruding portions 42 hold the rotating portion 32 at the upper end position.

Projections 44 are formed in the vicinity of the protruding portions 42 (or on the side of the side 42a). The projections 44 interact with the outer circumference of the rotating portion 32 on a path on which the rotating portion 32 is rotated so as to apply rotational load to the rotating portion 32. The rotating portion 32 is disposed so as to make an angle of, for example, approximately 45 degrees (or less) between the lower end position and the upper end position.

As shown in FIG. 4, the rotating portion 32 has a pin 48 that is inserted into the cylindrical portion 34 of the grommet 30. The pin 48 has a convex portion 50 that comes into contact with an inner projection 3C4at of the expandable/shrinkable portions 34a so as to deform (or expand) the expandable/shrinkable portions 34a radially outward. When the rotating portion 32 is drawn out from the grommet 30 to a predetermined height at which the convex portion 50 moves away from the inner projection 34at of the expandable/shrinkable portions 34a so as to deform the expandable/shrinkable portions 34a radially inward, the locking component 22 is allowed to be detached from the holes 14a, 18a.

The pin 48 has rotating plates 52 formed at an upper end thereof. Four, for example, of such rotating plates 52 are spaced at an equal angle and are in contact with the sides 42a, 42b of the protruding portions 42 in the larger-diameter cylindrical portion 36 so as to be held at the lower end position and the higher end position. The rotating plates 52 are subjected to a predetermined level of rotational load through sliding contact with the projections 44 and have their bottoms disposed on the slanted guide surfaces 40.

A circular disc 54 is formed on the top of the rotating plates 52 and has the key receiving portion 24 formed therein. As shown in FIGS. 3 and 5, the key receiving portion 24 has a projection 58 formed in the rotational center of the rotating portion 32 and a single recess 60 formed away from the rotational center. The projection 58 is cylindrically shaped, while the recess 60 has a circular cross-section shaped opening. The key receiving portion 24 is labeled on its top surface with indicators 62 of arrows indicating rotational direction.

As shown in FIG. 1, the service plug 26 has a releasing side recess 64 that engages with the projection 58 of the key receiving portion 24 and a releasing side projection 66 that engages with the recess 60 of the key receiving portion 24. The releasing side recess 64 may consist of a hole.

The locking system 10 configured as described above will be described below.

As shown in FIGS. 1 and 2, the service plug 26 is taken out from the main unit plug 28 as a first step. As a result of this step, the electric circuit having a plurality of batteries connected therein is cut off, which blocks electric power supply from the battery module.

Figure 7:
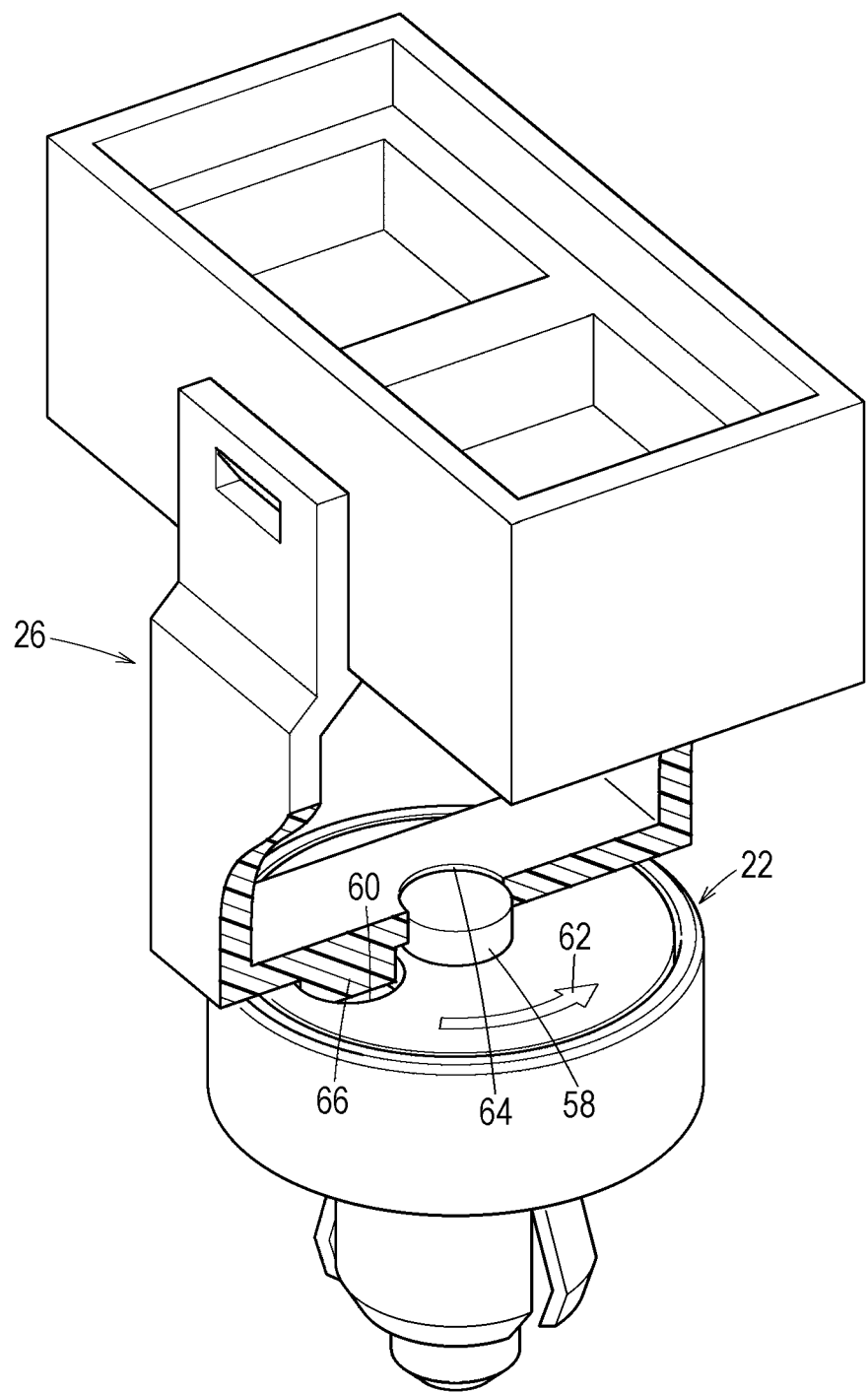
FIG. 7 is a schematic perspective view showing how the locking component is rotated by a service plug.

Next, an operator inverts the service plug 26 to face the key receiving portion 24 of the locking component 22. As shown in FIG. 7, the releasing side recess 64 and the releasing side projection 66 of the service plug 26 are engaged with the projection 58 and the recess 60 of the key receiving portion 24, respectively. When the service plug 26 is rotated in the direction indicated by the arrows of the indicators 62 after such an engagement is successfully performed, the rotating portion 32 is turned in the direction indicated by the arrows around the releasing side recess 64 and the projection 58.

At this time, as shown in FIG. 6, the rotating plates 52 of the rotating portion 32 are disposed so as to be in contact with the sides 42a of the protruding portions 42 and, when the rotating plates 52 begin to turn, come into sliding contact with the projections 44 adjacent to the protruding portions 42. As a result of this contact, the rotating plates 52 are subjected to a predetermined level of rotational load and are further rotated beyond the projections 44. The rotating portion 32, while being rotated, is elevated under guidance by the slanted guide surfaces 40 and the rotating plates 52.

Figure 8:
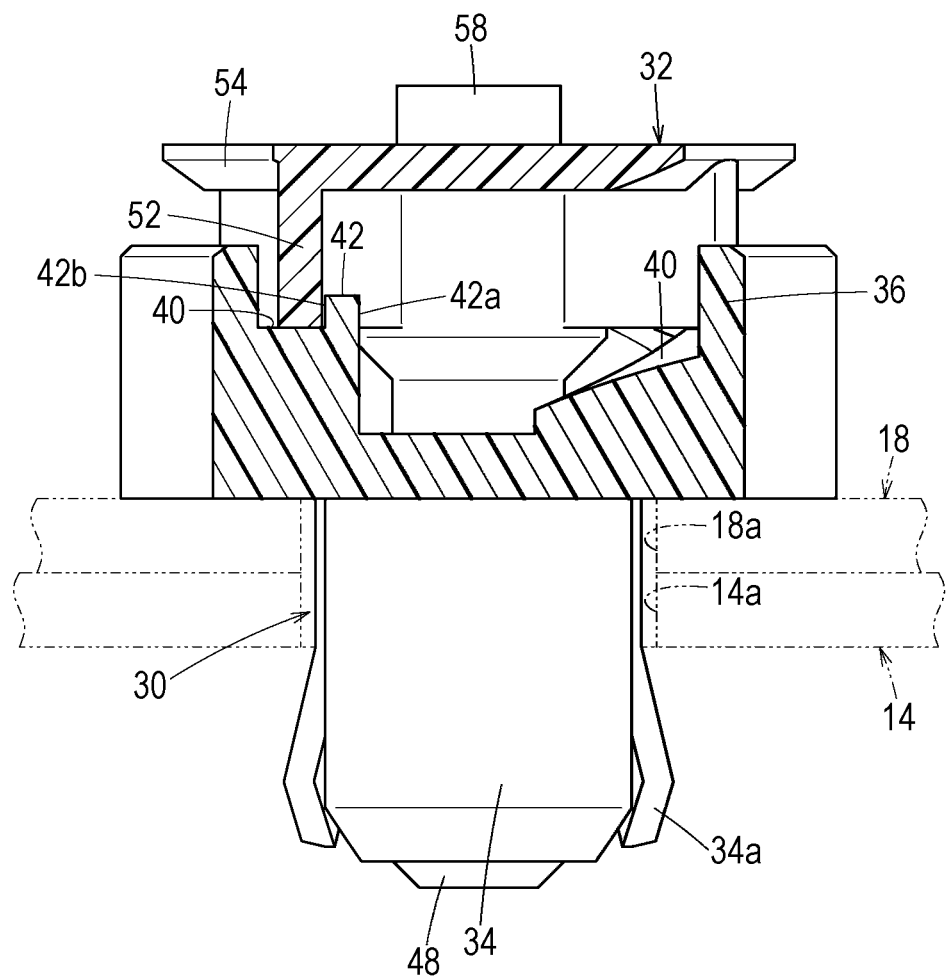
FIG. 8 is a schematic cross-sectional view showing the locking component is being rotated.

When the rotating portion 32 is rotated by a predetermined angle (approximately 45 degrees), the rotating plates 52 come into contact with the sides 42b of the protruding portions 42 and are held in this state (see FIG. 8). In addition, the operator holds the rotating portion 32 at the upper end and lifts the rotating portion 32 up. Consequently, the rotating portion 32 is held at the halfway position of the grommet 30 when the convex portion 50 of the pin 48 moves away from the inner projection 34at of the expandable/shrinkable portions 34a.

As a result, the expandable/shrinkable portions 34a deform and shrink radially inward. This allows the locking component 22 to move away from the holes 14a, 18a so as to be able to be taken out from the casing 14 and the covering component 18. Then, the covering component 18 is removed from the casing 14 by unscrewing the plurality of bolts 20, thereby enabling device maintenance or replacement through the opening 16.

In the first embodiment, the key receiving portion 24 of the rotating portion 32 has the projection 58 as the rotational center and the single recess 60 formed away from the rotational center. Accordingly, the rotating portion 32 (locking component 22) can be rotated by using only the service plug 26 having the releasing side recess 64 that engages with the projection 58 and the releasing side projection 66 that engages with the recess 60.

Specifically, engagement of only the operator's finger or a tool (scraper or the like) with the single recess 60 fails to successfully apply a load to the rotating portion 32 in the rotational direction. On the other hand, the use of leverage also fails to apply a load to the rotating portion 32 in the rotational direction because no projection is provided away from the rotational center.

This arrangement prevents to the greatest extent possible fastening by the locking component 22 from being released by general-purpose tools other than the service plug 26 and has the advantage of effectively simplifying the structure.

In addition, the larger-diameter cylindrical portion 36 constituting the grommet 30 has projections 44 that interfere with the outer circumference of the rotating portion 32 on a path of the rotating portion 32 in such a manner that rotational load is applied to the rotating portion 32. For this reason, application of a load to the rotating portion 32 by general-purpose tools (thin tool or the like) fails to rotate the rotating portion 32 unless such a load exceeds a certain level. Consequently, fastening by the locking component 22 can be prevented without fail from being released by general-purpose tools other than the service plug 26.

Figure 9:
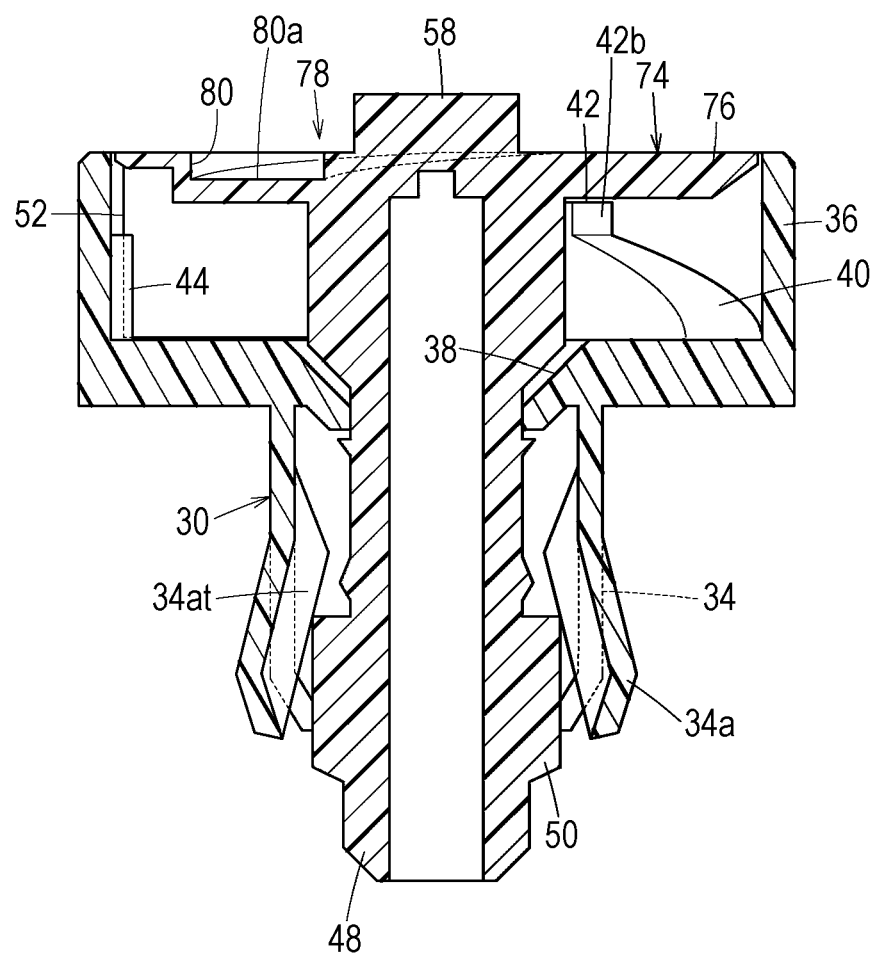
FIG. 9 is a partially schematic cross-sectional view of a locking component constituting a locking system according to a second embodiment of the present application.

FIG. 9 is a partially schematic cross-sectional view of a locking component 72 constituting a locking system 70 according to a second embodiment of the present application. The same reference numerals and symbols assigned to the locking component 72 as those assigned to the locking component 22 constituting the locking system 10 according to the first embodiment 1 refer to the same components, and repeated descriptions of the same components are omitted.

Figure 10:
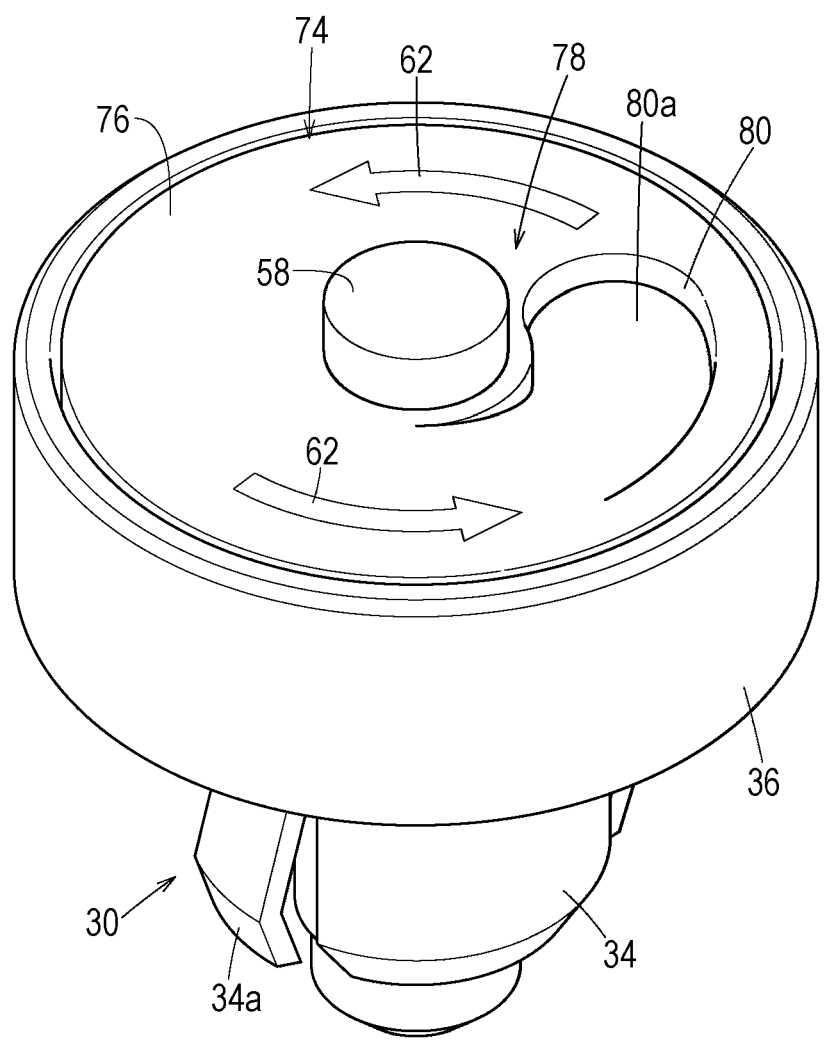
FIG. 10 is a schematic plan view of the locking component.
Figure 11:
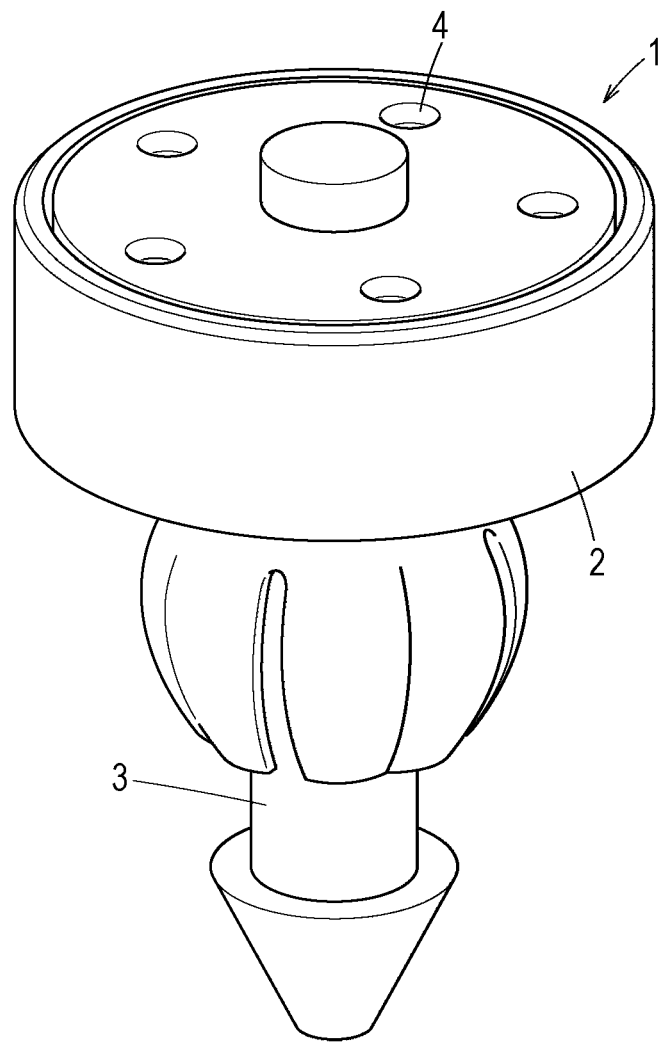
FIG. 11 is a schematic perspective view of an interlock clip disclosed in Japanese Unexamined Patent Application Publication No. 2006-228526.

The locking component 72 has a grommet 30 and a rotating portion 74. The rotating portion 74 has a circular disc 76 provided with a key receiving portion 78. As shown in FIGS. 9 and 10, the key receiving portion 78 has a projection 58 formed at the rotational center of the rotating portion 74 and a single arc-like recess 80 provided away from the rotational center.

A bottom surface 80a of the recess 80 is slanted. The bottom surface 80a is deepest at a forward end in the rotational direction of the recess 80 and becomes shallower toward a rearward end in the rotational direction. The rearward end of the bottom surface 80a is configured to be approximately equal in level to the surface of the circular disc 76.

As described above, the bottom surface 80a of the recess 80 constituting the key receiving portion 78 is configured to be slanted in the second embodiment. With this arrangement, the releasing side projection 66 moves along a slanted surface of the recess 80 even if the service plug 26 applies the rotating portion 74 rotational load in the direction opposite to the direction in which locking is released. This prevents a rotational load exceeding a specified level from being applied to the rotating portion 74 in the direction in which the rotating portion 74 is fastened, thereby avoiding damage to the locking component 72 and the service plug 26 due to reverse rotation.

In the second embodiment, the bottom surface 80a of the recess 80 in the rotating portion 74 is configured to be slanted but is not limited to this. For example, the releasing side projection 66 of the service plug 26 may have a slanted top surface in the first embodiment. This produces the same effect as in the second embodiment. The first and second embodiments are described using the battery pack but are not limited to this. A facility housing various electrical devices may be used.

A locking system according to the present application includes a casing that houses a device therein, a covering component that covers an opening of the casing, a locking component that fastens the casing and the covering component to each other, and a locking release component. The locking release component engages with a key receiving portion provided in the locking component and releases fastening by the locking component by causing the locking component to be rotated.

The key receiving portion has a projection provided at a rotational center and a single recess provided away from the rotational center, while the locking release component has a releasing side recess that engages with the projection and a releasing side projection that engages with the recess. Accordingly, the locking component can be rotated by only the locking release component. With this arrangement, fastening by the locking component can be prevented from being released by a general-purpose tool other than a dedicated tool (locking release component) to the greatest extent possible and the structure can be effectively simplified.

Preferably, the locking release component is a service plug that cuts off an electric circuit of the device.

Preferably, the locking component includes a expandable/shrinkable grommet that is inserted into a hole of the casing and a hole of the covering component as a single unit and a rotating portion that fits into the grommet so as to expand the grommet in diameter and that has the key receiving portion.

Preferably, the grommet has projections formed therein, the projections interfering with an outer circumference of the rotating portion on a path on which the rotating portion is rotated and applying a rotational load to the rotating portion.

Preferably, the locking system has a bottom surface of the recess or a top surface of the releasing side projection configured to be slanted.

Obviously, numerous modifications and variations of the present invention are possible in light of the above teachings. It is therefore to be understood that within the scope of the appended claims, the invention may be practiced otherwise than as specifically described herein.

What is claimed is:
1. A locking system comprising:
a casing housing a device;
a covering component covering an opening of the casing;
a locking component fastening the casing and the covering component to each other; and
a locking release component that engages with a key receiving portion provided in the locking component and releases fastening by the locking component by causing the locking component to be rotated,
wherein the key receiving portion has a projection provided at a rotational center and a single recess provided away from the rotational center, the projection project- ing from a surface of the key receiving portion, the single recess being recessed from the surface of the key receiving portion; and wherein the locking release component has a releasing side recess that engages with the projection and a releasing side projection that engages with the recess.

2. The locking system according to claim 1, wherein the locking release component is a service plug that cuts off an electric circuit of the device.

3. The locking system according to claim 1, wherein the locking component includes an expandable/shrinkable grommet that is inserted into a hole of the casing and a hole of the covering component as a single unit and a rotating portion that fits into the grommet so as to expand the grommet in diameter and that has the key receiving portion.

4. The locking system according to claim 3, wherein the grommet has projections formed therein, the projections interfering with an outer circumference of the rotating portion on a path on which the rotating portion is rotated and applying a rotational load to the rotating portion.

5. The locking system according to claim 1, wherein a bottom surface of the recess or a top surface of the releasing side projection is configured to be slanted.

6. The locking system according to claim 1,
wherein the locking component is rotatable around a rotation axis, and
wherein an entirety of the single recess is spaced apart from the projection in a direction that is orthogonal to the rotation axis.

7. The locking system according to claim 1, wherein a bottom surface of the single recess has a circular shape.

8. A locking system comprising:
a casing to house a device in the casing having an opening;
a covering component to cover the opening of the casing;
a locking component to fasten the casing and the covering component to each other, the locking component including a key receiving portion comprising:
  a projection provided at a rotational center of the key receiving portion and projecting from a surface of the key receiving portion; and
  a single recess provided away from the rotational center and recessed from the surface of the key receiving portion; and
a locking release component to engage with the key receiving portion of the locking component so that the locking component is rotated to release fastening between the casing and the covering component, the locking release component comprising:
  a releasing side recess to engage with the projection of the key receiving portion; and
  a releasing side projection to engage with the single recess of the key receiving portion.

9. The locking system according to claim 8,
wherein the locking release component comprises a service plug that cuts off an electric circuit of the device.

10. The locking system according to claim 9, further comprising a main unit plug provided on the casing, wherein the service plug is attachable to/detachable from the main unit plug.

11. The locking system according to claim 10,
wherein when the service plug is connected to the main unit plug, the electric circuit of the device is electrically connected, and
wherein when the service plug is disconnected from the main unit plug, the electric circuit of the device is electrically cut off.

12. The locking system according to claim 8,
wherein the locking component includes an expandable/shrinkable grommet that is inserted into a hole of the casing and a hole of the covering component as a single unit and a rotating portion that fits into the expandable/shrinkable grommet so as to expand the expandable/shrinkable grommet in diameter and that has the key receiving portion.

13. The locking system according to claim 12,
wherein the expandable/shrinkable grommet has projections provided in the expandable/shrinkable grommet, the projections interfering with an outer circumference of the rotating portion on a path on which the rotating portion is rotated and applying a rotational load to the rotating portion.

14. The locking system according to claim 12,
wherein the expandable/shrinkable grommet has a cylindrical portion that is inserted into the hole of the casing and the hole of the covering component,
wherein the cylindrical portion has expandable/shrinkable portions which are radially deformable,
wherein the rotating portion has a pin that is inserted into the cylindrical portion of the expandable/shrinkable grommet, and
wherein the pin has a convex portion that comes into contact with an inner projection of the expandable/shrinkable portions so as to deform the expandable/shrinkable portions radially outward.

15. The locking system according to claim 14,
wherein when the rotating portion is drawn out from the expandable/shrinkable grommet to a predetermined height at which the convex portion moves away from the inner projection of the expandable/shrinkable portions so as to deform the expandable/shrinkable portions radially inward, the locking component is allowed to be detached from the hole of the casing and the hole of the covering component.

16. The locking system according to claim 8,
wherein a bottom surface of the single recess or a top surface of the releasing side projection is slanted.

17. The locking system according to claim 8,
wherein the locking component is rotatable around a rotation axis, and
wherein an entirety of the single recess is spaced apart from the projection in a direction that is orthogonal to the rotation axis.

18. The locking system according to claim 8, wherein a bottom surface of the single recess has a circular shape.

* * * * *